(12) United States Patent
Malloy et al.

(10) Patent No.: US 10,006,129 B2
(45) Date of Patent: Jun. 26, 2018

(54) METAL SURFACE SCALE CONDITIONING (71) Applicant: KOLENE CORPORATION, Detroit, MI (US)

(72) Inventors: James C. Malloy, Ferndale, MI (US); Dennis J. McCardle, Troy, MI (US); Richard M. Kitchen, Woodhaven, MI (US)

(73) Assignee: KOLENE CORPORATION, Detroit, MI (US)

( * ) Notice: Subject to any disclaimer, the term of this patent is extended or adjusted under 35 U.S.C. 154(b) by 0 days. days.

(21) Appl. No.: 15/177,524

(22) Filed: Jun. 9, 2016

(65) Prior Publication Data
US 2016/0289847 A1 Oct. 6, 2016

Related U.S. Application Data (62) Division of application No. 13/576,196, filed as application No. PCT/US2011/020479 on Jan. 7, 2011.
(Continued)

(51) Int. Cl.
C23G 1/19 (2006.01)
C23G 3/02 (2006.01)
(Continued)

(52) U.S. Cl.
CPC ............ C23G 1/19 (2013.01); B23B 45/06 (2013.01); C23G 3/02 (2013.01); C23G 3/021 (2013.01);
(Continued)

(58) Field of Classification Search
None
See application file for complete search history.

(56) References Cited

U.S. PATENT DOCUMENTS 2,717,845 A 9/1955 Carter
3,174,491 A 3/1965 Faler
(Continued)

FOREIGN PATENT DOCUMENTS

CN 1200142 A 11/1998
GB 1101273 A 4/1965
(Continued)

OTHER PUBLICATIONS

ISA/EP International Search Report re PCT Application No. PCT/US2011/020479, dated Jul. 15, 2011.
(Continued)

Primary Examiner — Allan Olsen
(74) Attorney, Agent, or Firm — Patrick J. Daugherty; Driggs, Hogg, Daugherty & Del Zoppo Co., LPA (57) ABSTRACT Methods and systems are provided for treating oxide scale on the surface of a metal object. In one embodiment, a system temperature control apparatus controls the temperature of metal object's surface to an application temperature below the Leidenfrost temperature point of an alkali metal hydroxide aqueous conditioning solution. An application apparatus wets the metal object's surface at the controlled temperature with a thin layer of the solution that engages the oxide scale, and a heating apparatus heats the wetted surface to a final conditioning temperature above a melting point of the alkali metal hydroxide by an additional value selected to effect conditioning of the oxide scale at a reasonable but not excessive rate by the melting alkali metal hydroxide reacting with the oxide scale. The system terminates additional conditioning to prevent creation of additional oxide scale beyond the conditioned depth.

20 Claims, 5 Drawing Sheets

Related U.S. Application Data (60) Provisional application No. 61/293,821, filed on Jan. 11, 2010.

(51) Int. Cl.
*B23B 45/06* (2006.01)
*B21B 45/06* (2006.01)

(52) U.S. Cl.
CPC ............. *C23G 3/023* (2013.01); *C23G 3/027* (2013.01); *B21B 45/06* (2013.01)

(56) References Cited

U.S. PATENT DOCUMENTS

| | | |
|---|---|---|
| 3,468,621 A | 9/1969 | Arnold et al. |
| 3,617,039 A | 11/1971 | Hiroshima et al. |
| 4,251,956 A * | 2/1981 | Hirata .................... B21B 45/08 134/122 R |
| 5,221,358 A | 6/1993 | Malloy |
| 5,272,798 A | 12/1993 | Cole et al. |
| 5,505,786 A | 4/1996 | Cole et al. |
| 6,450,183 B1 | 9/2002 | Cole et al. |
| 6,582,586 B1 | 6/2003 | Akashi et al. |
| 6,776,359 B2 * | 8/2004 | Cole .................... B05B 13/0278 134/104.1 |
| 6,851,434 B2 * | 2/2005 | Cole ........................ C23G 1/14 134/102.1 |
| 2011/0186224 A1 | 8/2011 | Behrens et al. |
| 2013/0029054 A1 | 1/2013 | Malloy et al. |

FOREIGN PATENT DOCUMENTS

| | | |
|---|---|---|
| TW | 552319 B | 9/2003 |
| WO | 0146496 A1 | 6/2001 |

OTHER PUBLICATIONS

Japanese Patent Office action dated Jan. 13, 2015 re Application No. 2012-548143, Filed Jul. 7, 2012, of Kolene Corporation.
Taiwan Patent Office action dated Mar. 3, 2015, 2015 re Application No. 100100915, Filed Jan. 11, 2011, of Kolene Corporation.
European Patent Office action dated Nov. 18, 2016 re Application No. 11701570.1 Filed Aug. 8, 2012, of Kolene Corporation.
Korean Patent Office action dated Aug. 25, 2016 re Application No. 10-2012-7020620, Filed Aug. 6, 2012, of Kolene Corporation.

* cited by examiner

METAL SURFACE SCALE CONDITIONING

FIELD OF THE INVENTION

This invention relates generally to conditioning of oxide or scale on metal surfaces.

BACKGROUND OF THE INVENTION

The conditioning of oxide surfaces or scale on metal surfaces, sometimes referred to as descaling, is desired with respect to the production of stainless steel and superalloy metal strips. While our discussion focuses primarily on metals in strip form, the applicability and value of our invention may be useful for conditioning oxide surfaces or scale in various shapes, geometries, or assemblies other than metal strip; it is not our intention to limit the benefit to only metal strip. Stainless steels are ferrous alloys containing more than about 10% chromium for the purpose of enhancing corrosion and oxidation resistance, and may also contain nickel, molybdenum, silicon, manganese, aluminum, carbide formers and other elements. Families of superalloys may contain nickel or cobalt as the predominant base element, and incorporate more exotic alloying elements, such as tungsten, titanium, niobium, and other elements. All of these base elements and additive elements have a high affinity for oxygen at high temperatures and form tenacious and chemically stable oxides which complicate their subsequent removal which is required prior to additional processing or sale.

Prior art descaling techniques for some grades of low alloy steels with very light scale include pickling of steel strip in mineral acid, such as sulfuric acid, hydrochloric acid, hydrofluoric acid, nitric acid, or mixtures thereof. However, often a mere acid pickle is insufficient in treating higher alloy steel strips. Conditioning of the scale before acid pickling may be required. Typical compositions used for scale conditioning are caustic mixtures of alkali metal hydroxides and alkali metal nitrates with various other additives such as alkali halides carbonates, and/or other oxidizing agents, often referred to as descaling or scale conditioning salts. A conventional technique for using such compositions is in a bath of fused anhydrous salt in a vessel at elevated temperatures, e.g. 427° C. (800° F.) to 538° C. (1000° F.), in which a metal object is first immersed, followed by a water rinse and acid pickle.

BRIEF SUMMARY OF THE INVENTION

Methods and systems are provided for treating oxide scale on the surface of a metal object. In one embodiment, a system includes a temperature control apparatus that controls the temperature of metal object's surface to an application temperature below the Leidenfrost temperature point of an aqueous conditioning solution comprising an alkali metal hydroxide, wherein the metal object's surface has an oxide scale having an initial depth from the metal object's surface. An application apparatus wets the metal object's surface at the controlled temperature with a thin layer of the aqueous conditioning solution which engages the oxide scale. A heating apparatus heats the wetted metal object surface to a final conditioning temperature that is above a melting point of the alkali metal hydroxide in an anhydrous form by an additional value selected to effect conditioning of the oxide scale on the metal surface at a reasonable but not excessive rate, the heated wetted metal object surface thereby evaporating water in the aqueous conditioning solution and melting the alkali metal hydroxide in the anhydrous form on the metal object's surface, wherein the melting alkali metal hydroxide reacts with the engaged oxide scale and reduces the oxide scale to a conditioned depth from the metal object's surface that is less than the initial depth. The system further terminates additional conditioning of the metal object's surface beyond the conditioned depth, the terminating preventing a creation of an additional oxide scale beyond the conditioned depth from the metal object's surface.

DETAILED DESCRIPTION OF EMBODIMENTS OF THE INVENTION

There are a variety of drawbacks to immersion salt bath techniques. The salt bath has to be maintained at elevated temperatures, which may be energy intensive. Fused caustic baths requiring submerged rolls may be difficult to maintain and may cause marring of the surface of the strip being descaled. There are "drag-out" problems and hazards with respect to treating strip steel with the heated fused composition: as the strip exits from a pot of fused composition, it carries a certain amount of the heated, fused composition with it, especially at high strip speeds. Efforts to incorporate metal wiping rolls to reduce this chemical drag-out from the bath may introduce their own set of process complications including scratching or marring the fine metal surfaces. The long-term high temperature exposure that these fused bath compositions are subjected to limit the compounds that may be incorporated into the working bath, further restricting process flexibility.

Figure 1:
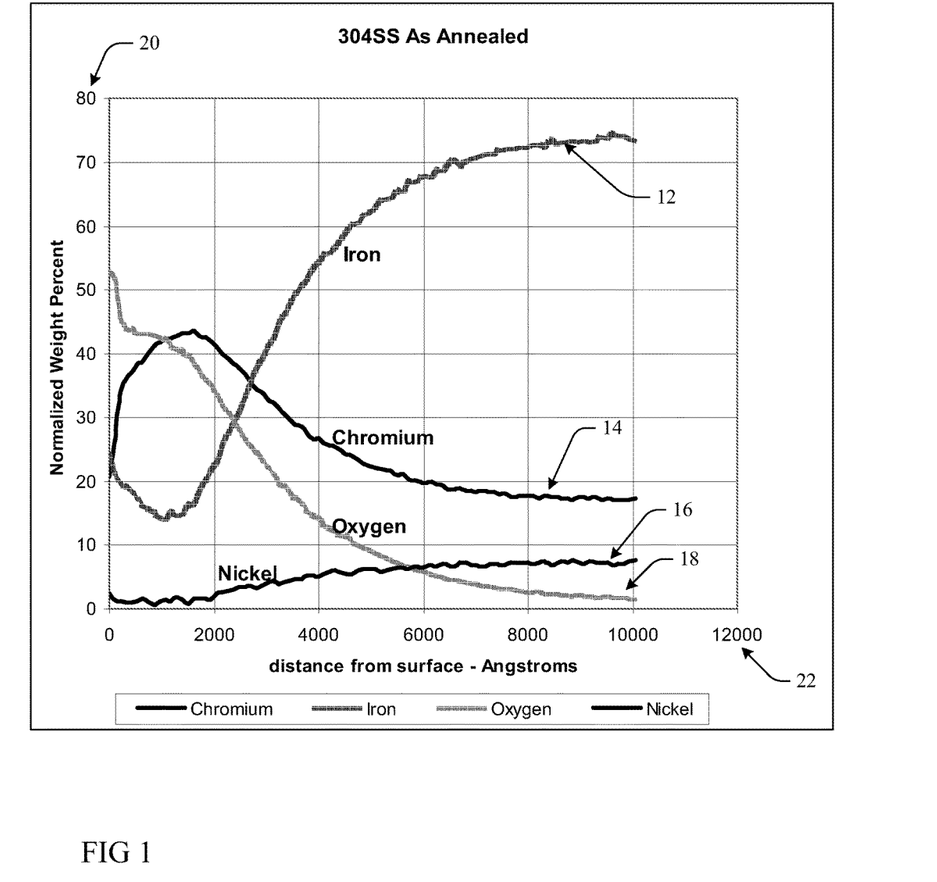
FIG. 1 is a graphic illustration of iron, chromium, nickel and oxygen as normalized weight percentages as a function of distance in Angstroms from the surface of an exemplary annealed type 304 stainless steel sample.

The use of immersion-type salt bath conditioning may also result in over-conditioning of the metal surface with excess oxide formation as well as other detrimental effects. FIG. 1 provides a graphic illustration of Scanning Auger Microprobe (SAM) profiles of iron (Fe) 12, chromium (Cr) 14, nickel (Ni) 16 and oxygen 18 representing normalized weight percentages (the vertical axis 20) as a function of distance in Angstroms (Å) from the surface (the horizontal axis 22) of a type 304 stainless steel sample annealed in a gas-fired furnace in an oxygenated atmosphere with 3% excess oxygen at a temperature of 1925° F. (1052° C.) for 120 seconds. The oxygen profile 18 is indicative of relative amounts of chromium oxide and iron oxide; as the oxygen levels diminish, so too do corresponding amounts of chromium oxide and iron oxide, and thus correspondingly increasing amounts of chromium and iron instead of chromium oxide and iron oxide. The surface of the annealed type 304 stainless steel sample (the region ranging from zero to 2000 Å along axis 22) is shown to be composed of primarily chromium oxide, with deeper regions progressively stabilizing until at from about 8000 Å to 10000 Å where the sample has a composition of about 18% Cr and 8% Ni, the typical and expected composition of type 304 stainless steel and thus beyond an extent needed for scale conditioning, and further wherein removal of any excess oxide formation may result in undesired surface effects as well as unnecessary and costly additional pickling processes.

Figure 2:
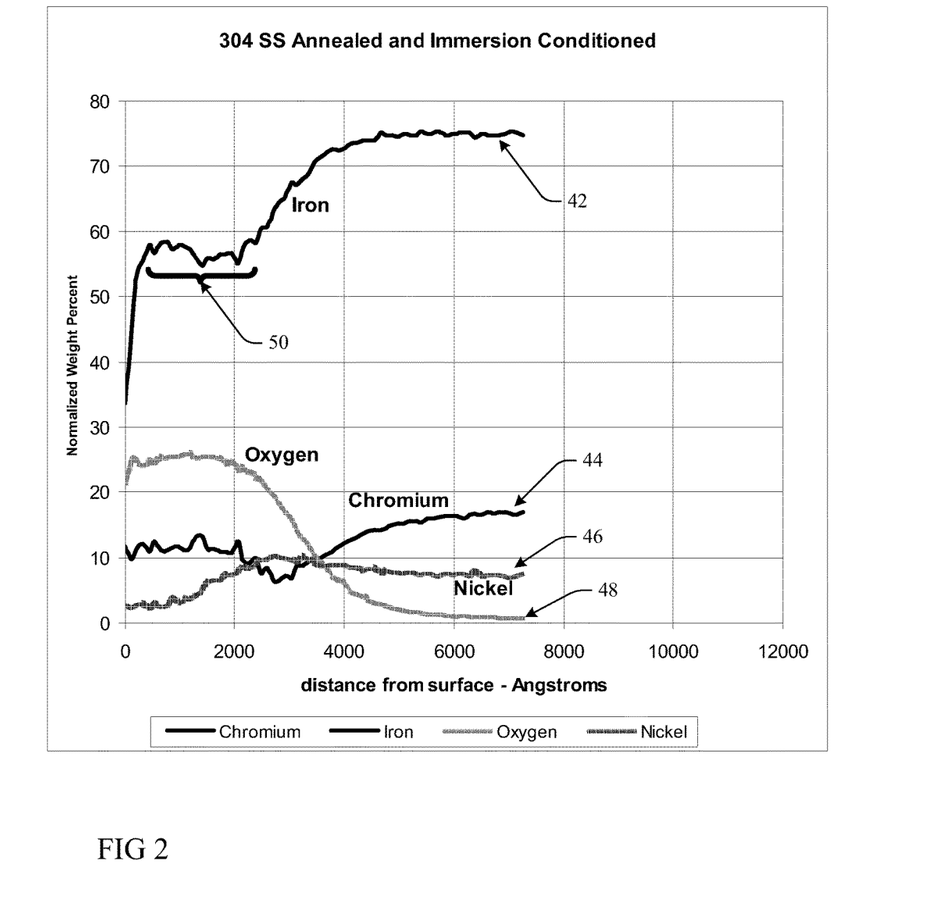
FIG. 2 is a graphic illustration of the normalized weight percentages of iron, chromium, nickel and oxygen in the type 304 stainless steel sample of FIG. 1 after immersion in a conventional, prior art salt-bath for a conventional time frame.

FIG. 2 provides a graphic illustration of SAM elemental depth profiles of the normalized weight percentages of iron 42, chromium 44, nickel 46 and oxygen 48 in a 10.16 centimeter (4 inch)×15.24 centimeter (6 inch) panel of 0.635 millimeter (0.025 inch) gage type 304 annealed stainless steel type 304 (18/8 chrome-nickel) after a conventional, prior art salt-bath conditioning treatment. The salt bath was an essentially anhydrous composition (i.e. it does not comprise enough water to react with the composition or a metal object surface submerged therein) comprising about 12% by weight sodium nitrate, about 10% by weight sodium chloride, about 15% by weight potassium hydroxide and about 63% by weight sodium hydroxide. This salt bath composition is taught in U.S. Pat. No. 3,260,619 issued to Shoemaker et al on Jul. 12, 1966, the entire disclosure of which is hereby incorporated, though it will be understood that alternative salt bath embodiments taught therein and elsewhere may also be used for conventional immersion salt bath conditioning. The profiles 42, 44, 46 and 48 were obtained after immersing the sample for a conventional, prior art time period of 30 seconds in the molten salt bath heated to an operating temperature of 850° F. (454° C.), the sample then removed from the bath and salt bath composition still adhering to the sample allowed to drip off for a few seconds, and the sample then promptly plunged into a pail of room (ambient) temperature tap water and subsequently air dried.

In contrast to the profile illustrated in FIG. 1, FIG. 2 shows that the original surface chromium oxide levels have been almost completely removed, with only iron oxide remaining and a residual conditioned scale occurring from about 4000 to about 5000 Å, where after (from 5000 Å and deeper from the surface) the stainless steel sample composition stabilizes. Of further interest is a "shoulder" region 50 on the iron profile 42 from about zero to about 2000 Å, wherein the normalized weight percentage of iron generally oscillates between about 55% and 58% as the depth increases over this range, until starting to progressively climb after 2000 Å in depth. This oscillation suggests that excessive conditioning processes are occurring, unnecessarily increasing the amount of conditioned oxide scale that must be subsequently removed, as further discussed below and which becomes even more apparent with reference to FIG. 3.

Figure 3:
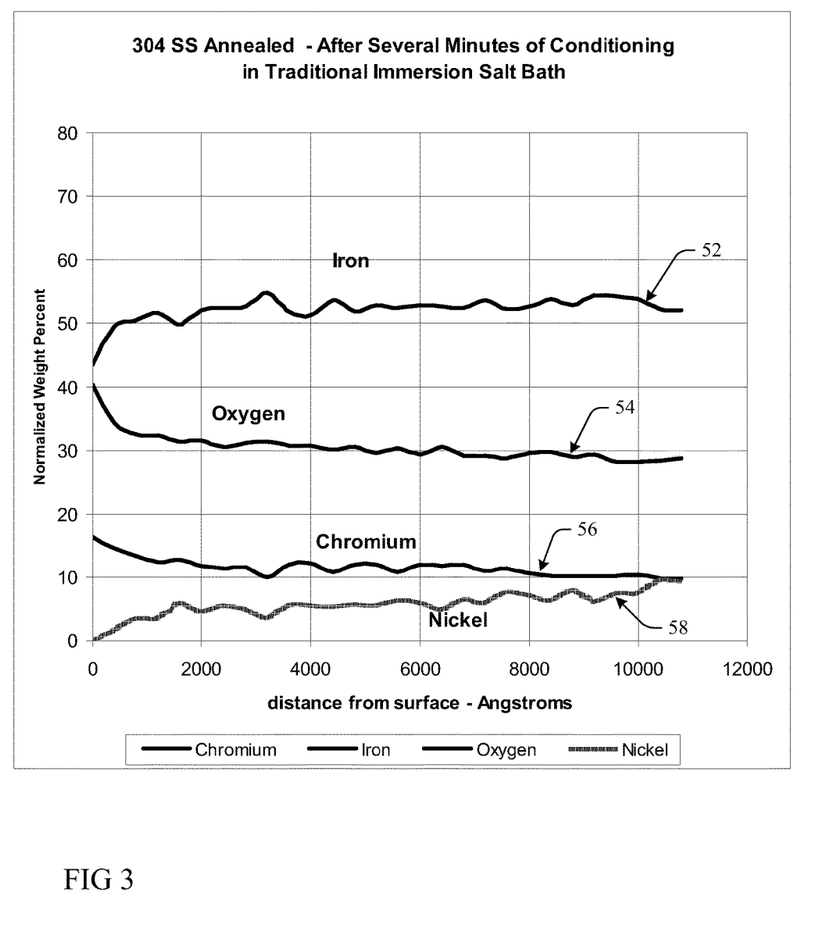
FIG. 3 is a graphic illustration of the normalized weight percentages of iron, chromium, nickel and oxygen in the type 304 stainless steel sample of FIG. 1 after immersion in a conventional, prior art salt-bath for an extended time frame.

Reaction to the scale on a strip generally occurs to completion quickly upon immersion in such baths; however, the logistics of strip processing generally dictate that the strip remains submerged in the bath well after optimal conditioning has already been obtained; since the conditioning reaction progresses so far so rapidly, over-conditioning necessarily occurs before the conditioned strip leaves an immersion bath, thus obviating any opportunity for timely quenching to prevent over-conditioning. FIG. 3 is a graphic illustration of SAM profiles of normalized weight percentages of iron 52, chromium 56, nickel 58 and oxygen 54 in a 0.635 millimeter (0.025 inch) gage, 10.16 centimeter (4 inch)×15.24 centimeter (6 inch) panel of the type 304 annealed stainless steel of FIG. 1 after immersion in the prior art salt-bath of FIG. 2 for an extended time frame, namely for about 120 seconds. As before with respect to FIG. 2, the sample was then removed from the bath, salt bath composition still adhering to the sample allowed to drip off for a few seconds, and then the sample was promptly plunged into a pail of room (ambient) temperature tap water and subsequently air dried. FIG. 3 clearly shows the deleterious effects of long immersion time conditioning, which may happen when a continuous process strip line incorporating salt bath conditioning stops or slows down and a stainless steel strip is left exposed to a molten immersion process for a long time, e.g. 60, or 120 seconds or even longer. The iron profile 52 in view of the oxygen profile 54 indicates that iron oxide occurs at a steady and unacceptably high level over the length of the Auger scan data, to over 10000 Å of depth from the surface, with chromium 56 reduced to almost half of its native, desired concentration. It is believed that this occurs because the iron oxide does not dissolve in the molten salt (further indicated in the small shoulder region 50 of FIG. 2), but instead the alkali chromate does, resulting in unacceptable diminishment of the chromium deep into the metal surface.

Figure 4:
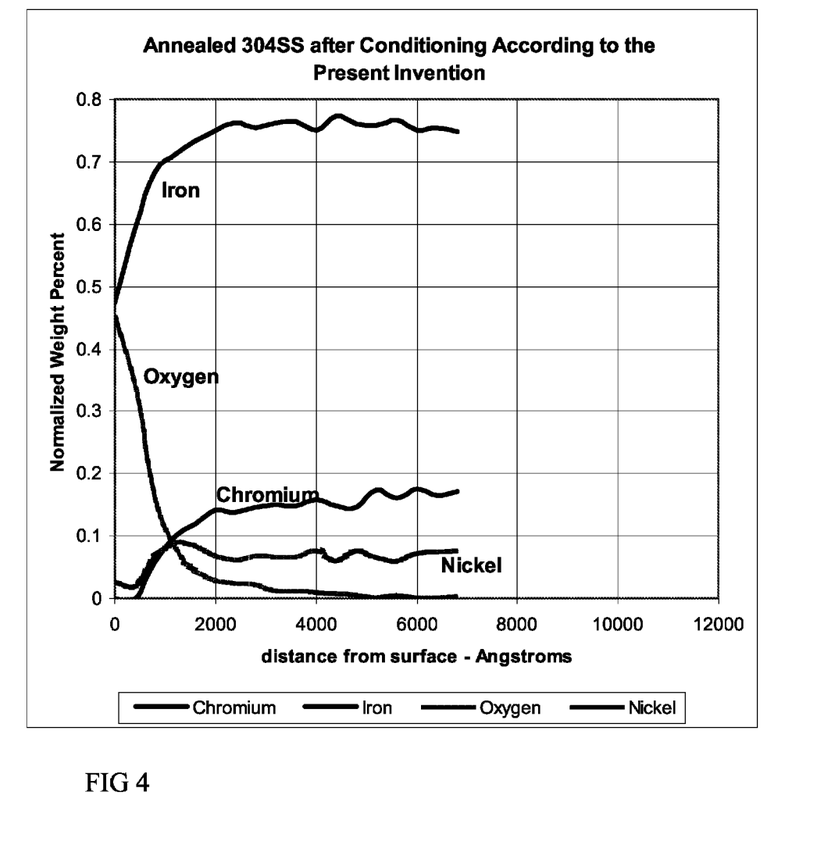
FIG. 4 is a graphic illustration of the normalized weight percentages of iron, chromium, nickel and oxygen in the type 304 stainless steel sample of FIG. 1 after conditioning according to the present invention.

FIG. 4 provides SAM profiles of iron 62, chromium 64, nickel 66 and oxygen 68 for another 0.635 millimeter (0.025 inch) gage, 10.16 centimeter (4 inch)×15.24 centimeter (6 inch) panel of the type 304 annealed stainless steel of FIG. 1 as conditioned according to the present invention. An alkaline aqueous liquid was applied thinly to the annealed type 304 stainless at an ambient temperature, the coated sample then heated in a horizontal orientation in an electric oven pre-heated to about 800° F. (427° C.) for about 120 seconds, wherein the panel was brought to final treatment temperature of about 650° F. (343° C.), the sample then subsequently tap water rinsed within 30 seconds of reaching said treatment temperature and then air dried. FIG. 4 shows a clear contrast to and improvement over the results profile of a conventional time and temperature immersion treatment depicted in FIG. 2. It will be understood by one skilled in the art that the ultimate goal in conditioning annealed stainless steel is to remove original surface chrome oxide without adversely attacking the underlying metal (i.e. reducing the native chromium levels) and further without unnecessarily building up new iron oxide that needs to be subsequently removed in the pickling section of the line. As FIG. 4 illustrates, a chrome oxide-free surface is obtained relatively quicker and more efficiently relative to depth from the surface; the iron oxide shoulder 50 of FIG. 2 is avoided, the iron profile line 62 instead quickly and steadily climbing up to a level content by the 2000 Å in depth, and further wherein the desired composition of about 18% Cr 64 and 8% Ni 66 is also reached at 2000 Å in depth, an improvement of about 60% over the performance of the convention immersion conditioning results depicted in FIG. 2 in reducing the depth and extent of surface oxides.

The present invention is appropriate for practice with a wide variety of metals, illustratively but not exhaustively including stainless steels and superalloys and their alloying elements such as manganese, molybdenum, titanium, etc. The invention is also applicable to reacting with oxides of these and other alloying elements to form more easily removed species such as alkali manganates, molybdates, titanates, etc., for example in the conditioning of titanium alloys, molybdenum alloys, etc., including as incorporated into other alloys as alloying agents.

According to the present invention, the time required to condition the oxide scale is virtually instantaneous once a final treatment temperature threshold is reached. For stainless steel, the final treatment temperature is believed to range from about 600° F. (315° C.) to about 650° F. (343° C.), and the selected or determined temperature may be dependent on material composition as well as dimensional parameters. For example, the 650° F. (343° C.) was determined to be the final treatment temperature for the 0.635 millimeter (0.025 inch) gage, 10.16 centimeter (4 inch)×15.24 centimeter (6 inch) panel of type 304 annealed stainless steel of FIG. 1 by placing a panel coated on one side with an alkaline aqueous liquid according to the present invention in a horizontal plane and then heating it (in one example from below with a high temperature hot air gun or by placing it on a resistance heater coil). Once the coated surface reached the final treatment temperature, the 650° F. (343° C.) as determined by a fine diameter contact thermocouple, a central core area of the panel very quickly changed from an annealed color to an alkali chromate color characteristic of conditioning, and wherein the conditioned area radially grew outward as the critical temperature was reached in the peripheral areas of the panel. Thus, achievement of the final treatment temperature and associated complete oxide treatment according to the present invention may be determined by a visual examination of the annealed steel, for example by looking for a glossy molten salt film and distinctive color change appearance. It will also be understood by one skilled in the art that the time required for an annealed metal surface coated with an alkaline aqueous liquid according to the present invention to reach the final treatment temperature is a function of a difference in temperature (delta T) between said final treatment temperature and the temperature of the heating device (heat flux). By thinly coating the surface of annealed panel to be treated, the present invention limits the chemical sink present on the metal surface, and thus once the final treatment temperature is reached, little additional reaction takes place even if the metal object is held at the final treatment temperature for some additional time.

Alkaline aqueous liquids according to the present invention comprise eutectic hydroxides, and fractional percentages of at least one surfactant are included to help wet-out performance of the liquid and aid in maintaining thin coating dimensions. Some examples further optionally comprise oxidizers to boost the oxidizing potential of the liquid, and compositions according to the present invention may be custom blended depending on the type and quantities of oxides that may be present in the steel to be conditioned. One embodiment of an alkaline aqueous liquid according to the present invention used to obtain the conditioning illustrated in FIG. 4 is a eutectic blend of sodium and potassium hydroxides at about a 33% by weight (more specifically, 18% potassium hydroxide and 12% sodium hydroxide), 3% by weight sodium nitrate as an oxidizer boost, and 67% by weight water, and to which was added three drops each of Nonidet® SF-5 and Mirataine® ASC (NONIDET SF-5 is a trademark of Air Products and Chemicals, Inc., in the United States or other countries; MIRATAINE is a trademark of Rhodia in the United States or other countries). Nonidet® SF-5 is a low foaming alkoxylated nonionic surfactant made from linear alcohol, and the chemical name of Mirataine® ASC is Cocamidopropyl Hydroxysultaine.

According to the present invention, the solubility of the reaction products, (e.g. alkali chromate) may be quickly reached in the thin and light weight amount of the alkaline aqueous liquid incorporating the surfactant. By keeping the coating layer thin, reactive chemicals in the alkaline aqueous liquid are substantially consumed immediately upon the coated object reaching the final treatment temperature with little residual reactants remaining available for further oxide conditioning or other reactions with the treated metal object: thus, any time lag from the completion of conditioning to quenching or water rinsing is generally inconsequential to the performance of the process, and more particularly will not cause the over-conditioning harm to the metal substrate shown by the long-term immersion treatments as illustrated in FIG. 3. It is also apparent that by only requiring enough of the alkaline aqueous liquid to thinly coat an object to be treated, the need for substantial additional quantities in order to form molten salt baths is avoided, and thus the present invention enables greater material cost and handling efficiencies relative to prior art immersion processes. In addition, since the chemical constituents of the descaling film only need to be stable at temperature for a very short time, more novel or reactive chemical compounds may be employed than is possible in traditional immersion chemical formulations due to their need for long term high temperature stability.

The present invention also provides superior energy efficiencies relative to conventional immersion processes. In one aspect, it is necessary to operate immersion process salt bath pots at temperatures well above the final treatment temperature or range practiced by the present invention. The viscosities of the higher density anhydrous salt bath solutions appropriate for conventional immersion processes at the exemplary final treatment temperature range described above (from about 600° F. (315° C.) to about 650° F. (343° C.)) are too high, prohibiting operating the salt bath within this temperature range in order to prevent excessive salt drag-out, and requiring that the salt bath pots instead be operated and held at much higher temperatures, such as from about 752° F. (400° C.) to about 932° F. (500° C.), in order to prevent material drag-out problems. It will also be noted that though other prior art teaches conditioning metal objects by coating the objects with an alkali solution and then heating the coated objects in an annealing furnace, these annealing processes require significantly higher temperatures, generally in excess of 1850° F. (1010° C.), and further fail to produce the efficient conditioned profile achieved in FIG. 4 (i.e., reducing the depth of surface scale to and producing the desired resultant composition of about 18% Cr and 8% Ni at 2000 Å in depth).

Moreover, the conventional immersion process provides an "infinite" chemical sink to continually accept reaction products and provide fresh chemical reactants to a metal object being conditioned. For example, a stainless steel strip being conditioned in a processing line exits an immersion bath at a temperature in excess of the optimum temperature for minimal excess oxide formation, inherently resulting in an over-conditioning, and further any time lag between the exit from the immersion bath and entrance into a quench or rinse water vessel will contribute to further over conditioning, events that often occur as functions of line geometry and strip line speeds. Some prior art immersion systems attempt to remedy this problem through enhancing radiant or forced cooling, for example through the use of fans; however, such efforts not only result in uneven cooling or present safety hazards from spraying molten salt droplets off on the conditioned metal and about the immediate area, and are generally insufficient in avoiding over-conditioning as the metal object simply cannot be quenched or cooled fast enough after optimal conditioning is reached through an immersion process, as a comparison of the profiles 42, 44, 46 and 48 of FIG. 2 to the respective profiles 62, 64, 66 and 68 of FIG. 4 clearly illustrates.

The final treatment temperature of the heated, wetted metal object is dependent upon the object material, finish and dimensions, as well as on the alkaline aqueous liquid properties (water content percentage, etc.). Generally, the final treatment temperature achieved is the melting point of the conditioning salts within the chemical mixture plus an additional value to effect conditioning of the oxide scale on the metal surface at a reasonable but not excessive rate. The time and heat required to effect conditioning is dependent upon the thickness and material content of the strip to be conditioned, which in some cases may act like a heat sink in absorbing heat that would otherwise raise the temperature of the metal surface and conditioning solution disposed thereupon. For example, in the case of one eutectic NaOH/KOH salt solution useful according to the present invention, bringing the solution to about 170° C. (338° F.) is sufficient to melt the salt, but satisfactory conditioning of a thin metal strip surface requires the temperature to be brought above that point to about 232° C. (450° F.) with conditioning occurring virtually immediately upon reaching said temperature, and whereas another strip example having a greater thickness must be brought up to a higher temperature of about 288° C. to 315° C. (550° F. to 600° F.) and further held there for a few seconds in order to result in an acceptable conditioning of the steel surface.

Accordingly, some processing system embodiments according to the present invention consider object material, finish and dimension and aqueous alkaline liquid properties. Other parameters useful in solving or achieving specified or desired object surface final treatment temperatures, and in some examples, in solving for final treatment temperature periods, may also be apparent to one skilled in the art. More particularly, for applications in which excess descaling chemicals may remain upon a treated surface after a specified or desired amount of oxide conditioning has been achieved, the metal surface may be quickly brought down below the final treatment temperature shortly after achieving said final treatment temperature, in some embodiments within three seconds or less, thus preventing over-conditioning by the remaining reactants prior to rinsing. Illustrative but not exhaustive examples of such factors include process line observations and events, required metallurgical properties of a metal object in view of times and temperatures in an annealing furnace (which in turn may dictate line speed), object heat up rates, temperature hold times and dominant anneal line speed requirements. Thus, processing system embodiments enable on-the-fly optimization in response to and subordinate to annealing and other line functions line changes to vary heat-up temperatures, hold times and alkaline aqueous liquid compositions and application amounts and rates, capabilities not possible with a conventional large hot immersion process.

Figure 5:
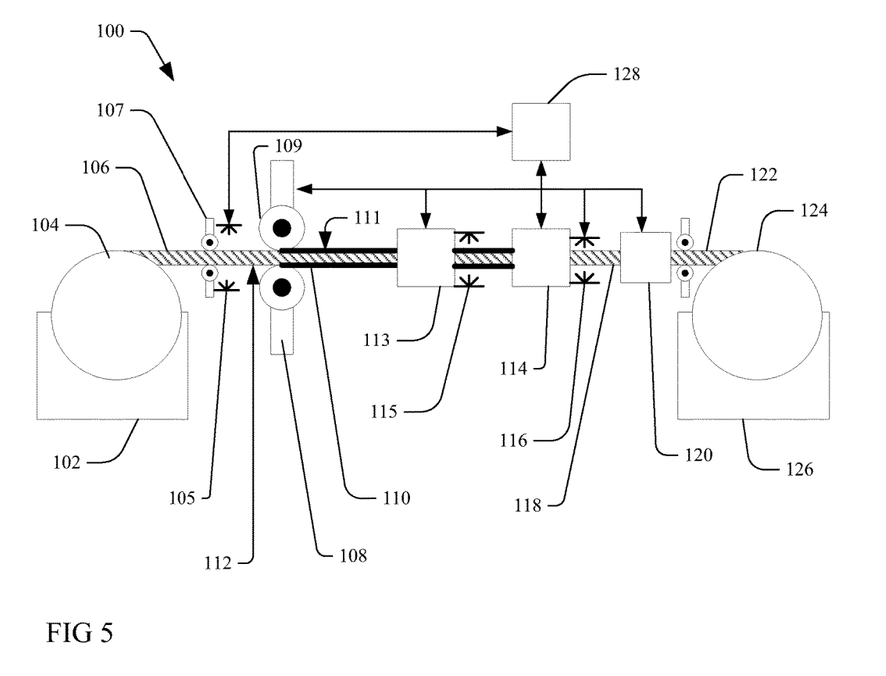
FIG. 5 is a diagrammatic view of a process for scale conditioning according to the present invention.

Referring now to the drawings and for the present to FIG. 5, a somewhat diagrammatic representation of a process or system 100 for scale conditioning section according to this invention is shown. The line process 100 has an uncoiler 102 adapted to support and uncoil a coil of steel 104 for removal of scale formed during annealing. The uncoiler 102 uncoils the steel from the coil 104 as a strip of steel 106 which is drawn through a conditioning solution applicator 108 configured to apply a thin coating 110 of an alkaline aqueous liquid according to the present invention and described above (e.g. comprising an alkali metal hydroxide or a mixture of alkali metal hydroxides and a surfactant) to the top and bottom surfaces 112 of the steel strip 106. At various points in the system 100, the uncoiled strip 106 is drawn through and guided by a set of conventional tracking and bridle rolls 107 configured to keep the strip 106 on track and maintain proper tension in the strip 106. While the diagram illustrates the line in a horizontal plane, it is not the intention to limit the line configuration to a single plane. Certain elements such as the solution applicator 108 may be easily configured in a vertical plane followed by other vertical or horizontal or angled elements as necessary to carry out the process and/or accommodate physical line constraints. In some embodiments, the system/process 100 is a continuous anneal and pickle line, wherein the uncoiling element 102 also provides pre-heat and annealing furnace elements in order to heat and/or anneal the steel strip as will be appreciated by one skilled in the art in the art. While FIG. 5 illustrates a metal strip 106 moving relative to a stationary application nozzle 108, other configurations where metal shapes other than strip may benefit from a movable application device relative to a stationary metal object are also anticipated.

The surface temperatures of the steel strip surfaces 112 at application of the thin coating 110 of the alkaline aqueous liquid by the conditioning solution applicator 108 are below the Leidenfrost temperature of the alkaline aqueous liquid, and in some embodiments also below the melting point of alkali metal hydroxides within the conditioning solution. Sensors 105/115/116 may be provided comprising temperature-sensing devices (e.g. an infrared temperature sensor, a contact thermocouple, etc.) configured to measure temperatures of the strip 106 at various points in the process/system 100 as needed to verify that a desired temperature has been achieved, thus at 105 prior to solution application by the conditioning solution applicator 108. Ambient environmental temperatures are generally below boiling point and Leidenfrost temperatures, and thus steel strip 106 uncoiled by an uncoiler 102 without annealing furnace elements or processes will typically be at a temperature appropriate for application of the alkaline aqueous liquid by the conditioning solution applicator 108.

If, however, the uncoiler 102 anneals the strip 106, then the annealed strip 106 must first be quenched or otherwise cooled to bring the strip surfaces 112 down to a temperature below the Leidenfrost temperature prior to application by the conditioning solution applicator 108. In some applications, the line of steel strip 106 may be stopped or a cooling time period must otherwise lapse until the strip surface 112 temperatures cool to an acceptable temperature at the application of the solution. In other examples, the system/process 100 may further incorporate a temperature cooling section at 105 which includes one or more variable speed fans, flow control dampers, vents, or the like in order to cool the strip surfaces 112 to a desired temperature as confirmed by said temperature sensor 105.

Setting or achieving the final treatment temperature may also consider difficulties in uniformly controlling the temperature of the metal strip surfaces 112. For example, when the component 102 anneals the strip 106, such as within a continuous anneal and pickle line, the strip exiting an annealing furnace element 102 or an air cooler 105 positioned thereafter may have temperature differentials between different regions, for example between different edge regions, and/or between the top surface and the bottom surfaces. Such differential values may range from 100° F. (38° C.) to 200° F. (93° C.), depending on the strip dimensions (gage, width, thickness) and the metal composition (carbon, stainless, etc.). Thus, while some regions may be at a desired final treatment temperature, other regions of the strip 106 may be too hot and experience Leidenfrost effects at application, or they may be too cold and thus not successfully brought up to the final treatment temperature in the heating element 113 and thereby experience incomplete conditioning. (Such concerns are generally not an issue in traditional immersion salt bath, as the elevated temperatures of the molten salt baths are applied long enough to result in uniform strip temperatures.)

Accordingly, in some embodiments, the cooling elements 105 cool the strip surfaces 112 to a point below the Leidenfrost temperature of the conditioning solution plus an additional cooling margin value (for example, 100° F. (38° C.) to 200° F. (93° C.)) in order to ensure that no regions of the strip surfaces 112 are above the Leidenfrost temperature. Further, some heating elements 113 heat the strip surfaces 112 to the final treatment temperature plus an additional heating margin value (for example, 100° F. (38° C.) to 200° F. (93° C.)) in order to ensure that all regions of the strip surfaces 112 are brought to the final treatment temperature. Additional cooling or heating margins provided to account for such regional differentials may be small or even omitted for some very light gage steel strips, as their regional differentials may be small or negligible, and in one aspect due to lower heat sink and heat retention characteristics for lighter gage strips.

Formation of the thin alkaline aqueous liquid coating 110 by the conditioning solution applicator 108 may be achieved by a variety of ways, i.e., through any method or system that forms a uniform coating or complete wetting of the strip surfaces 112 with the conditioning solution. Illustrative but not exhaustive examples of conditioning solution applicator 108 elements and apparatuses include dunker roller or roll/roller coaters 109 as well as spray nozzles, curtain coaters and applicators, immersion methods and systems or combinations thereof. Solution metering or flow control articles may be utilized but are not generally required, and a conditioning solution applicator 108 may need only incorporate simple application limiting means that ensures complete wetting of the strip surfaces 112 to a specified maximum thickness amount 111; for example, an air knife or wiper roller may be provided to remove excess conditioning solution from the coating 110 and effect the specified minimum and/or maximum solution thickness values 111, with excess solution removed and recovered for subsequent re-use. Other methods and systems appropriate for use in assuring adequate and/or limited total thickness values 111 of the coating of the conditioning solution 110 applied to the strip surfaces 112 will also be appreciated by one skilled in the art.

The coated strip 106 is then driven into a heating section 113 wherein the coated strip surfaces 112 are brought up to a specified final treatment temperature or temperature range above the melting point of the solution alkali metal hydroxide(s) in anhydrous form plus an additional value to effect conditioning of the oxide scale on the metal surface at a reasonable but not excessive rate. The specified final treatment temperature need be maintained only long enough to thoroughly condition the engaged oxide scale, in some embodiments for no more or no less than a specified time period as described above, and wherein at the end of said period the heated strip temperature may be reduced below the conditioning temperature or range of temperatures by cooling or quenching in a cooling/rinsing section 114, which may also generally rinse off any excess, non-consumed conditioning solution alkaline products.

As also described above, the specified final temperatures/ranges and time periods are selected to produce preferred scale conditioning of the strip 106, and more specifically to be sufficient in both temperature and length of time to complete scale conditioning of the strip surfaces 112, yet limited in either or both of length of time and high temperature values in order to prevent over-conditioning of the strip surfaces 112. In some embodiments, the desired level of conditioning is a specified level of least-oxide-to-pickle conditioning and minimal base metal effect level selected as a function of strip material and dimension parameters, thereby minimizing the thickness and extent of oxide scale formation while successfully conditioning the steel surface.

The mechanism of conditioning according to the present invention is believed to be generally comparable to that of conventional molten oxidizing baths; the metal oxide is converted to a higher oxidation state that is partially dissolved in the conditioning salts and subsequent water rinse, the remainder rendered more readily removable by acid pickling. However, conditioning of the metal surface in the present invention occurs as the metal surface when completely wet with the solution is then heated until the water is evaporated and the salts are melted and react with the oxide on the strip surface, which occurs rapidly, often within seconds. In some embodiments, the conditioning process is terminated by rinsing and thereby cooling or quenching the strip 106 in the rinsing station 114 by the end of a specified conditioning time period (i.e., after effective conditioning occurs and prior to the occurrence of excessive oxide formation by remaining, residual reactants) to bring the strip surface 112 temperatures down below conditioning temperatures and also rinse the conditioning solution 110 off of the strip surfaces 112, for example through an array of water spray nozzles (not shown) being supplied with water, sometimes through use of a pump from a collection sump located below a spray area 114, and still other rinsing station 114 systems and methods will be appreciated by one skilled in the art. Temperature sensing/cooling elements 115 interposed between the heating section 113 and rinsing section 114 may ensure that the strip surface 112 temperatures are quenched below conditioning temperatures.

After the rinsing station 114, the conditioned strip 118 may be driven to an acid pickling section 120. By minimizing the degree of oxide formation, the present invention correspondingly reduces the amount of subsequent surface pickling required, which may thus reduce associated pickling processes as well as reduce surface dulling and roughening due to pickling relative to prior art processes. In contrast, prior art immersion bath processes using molten oxidizing baths may over-condition scale on a strip and form a cohesive base metal-iron oxide interfacial layer and subjacent chromium depleted zone, thus requiring more aggressive pickling and increasing both pickling costs and pickled surface roughness while also reducing product yield due to increased metal removal.

Acid pickling in the process 100 at 120 usually includes one or more acid tanks containing sulfuric acid and/or a mixture of nitric, hydrofluoric or other acids for submersion of the strip 106, although acid spray could also be used. In some embodiments, multiple acid pickles are utilized, and one or more of such pickle tanks may be used as required on any given conditioned strip 118 of stainless steel depending on many factors, including the composition of the steel, the thickness of the oxide, and other factors known in the art. Novel pickling compositions incorporating organic acids such as citric acid, or more environmentally-attractive acid mixtures incorporating oxidizing agents such as peroxides, would also experience enhanced performance if used in conjunction with this invention. With the scale removal process complete after pickling and rinsing the conditioned strip 118 becomes a descaled strip 122, wherein the descaled strip 122 is ready to be recoiled into a finished steel coil 124 on a recoiler 126.

Surface analyzers are generally provided within the system/process 100, for example within or adjacent to the rinsing station 114, the temperature sensing/cooling elements 105/115/116, within the pickling section 120, etc., said surface analyzers configured to monitor the strip surfaces 112 to detect and/or determine the amount of scale formed on the surface of the strip to be conditioned, a lack of conditioning or over-conditioning of the conditioned strip, etc., and to otherwise provide feedback and monitoring of conditioning performance of the system/process 100 to one or more line dynamics operating components, systems or other management elements 128. The line dynamic system component 128 may also communicate with various temperature sensing/cooling elements provided throughout the system/process 100 (for example, at temperature sensing/cooling elements 105/115/116, the conditioning solution applicator 108, the heating section 113, the rinsing station 114 and/or the acid pickling section 120, etc.), thereby ensuring specified strip temperatures during application of the conditioning solution, conditioning, rinsing and pickling operations as well as to enable optimizing of performance of the system 100 in response to said temperature observations. Inputs to the line dynamics operating system 128 may also include present system conditions, such as ambient temperatures, conditioning solution storage tank level sensors, flow controllers and distribution sensors, and storage tank temperature sensors. In some embodiments, chromium concentrations are observed in the rinse water in the rinsing station 114, thereby providing a direct measure of chromium removed from the scale to the line dynamic system component 128 or other operator, and other inputs will be appreciated by one skilled in the art.

The line dynamics operating system 128 may receive strip variables such as strip material composition, gauge, width, and any other special processing information as discussed above and elsewhere herein and then responsively determine specified conditioning temperatures and time periods, or to otherwise control a conditioning schedule or other system 100 parameters for the particular strip of steel 106 being treated. In some embodiments, the line dynamics operating system 128 includes a computer in communication with a memory in which is stored time, temperature and other parameters required for conditioning each of a plurality of types of steel, and further based on composition, gauge, width, line dynamics, etc.

Said surface analyzer elements may continuously monitor the condition of the strip 106 and if the strip surface 112 condition falls outside predetermined parameters, the line dynamics operating system 128 may adjust system/process 100 parameters to bring monitored surface conditions back within the required performance thresholds. Illustrative but not exhaustive parameters that may be controlled by the line dynamics operating system 128 include an amount of energy or heat expended and directed toward the strip 106 by, or amount of temperature increase effected by, the uncoiling/annealing/preheating element 102 and the heating section 113; the motive speed of the strip 106 relative to any of the system elements 108/113/115/114/116/120; the amount of cooling air, temperature or amount of temperature increase effected by cooling elements at 114, 115 or 116; and other system 100 parameters may be controlled by the line dynamics operating system 128.

The present invention enables on-the-fly scale conditioning optimization by varying one or more of (1) terminal conditioning temperatures or ranges of temperatures, (2) chemical composition components, (3) amounts of reactants utilized (e.g. amounts of chemicals applied to the scale on the strip surface 106 at 108) and (4) reaction time periods or ranges (e.g., by variably cooling the strip at a desired point to quench out a conditioning reaction). Prior art salt bath immersion processes cannot achieve such objectives due to the thermal inertia of the large salt mass in the salt baths, the line-speed dependent exposure times to the chemicals, and the static chemical composition of said baths.

Optimal amounts of scale conditioning may also be defined with respect to least-oxide-to-pickle condition specifications or observations for given metal object material and dimension parameters, as well as with respect to minimal base metal effects. In one aspect, the appearance and cost of producing a final pickled surface at 120 may provide a measure of the value of changing scale conditioning variables at any of the various process/system 100 elements. For example, in some embodiments, optimal conditioning may comprise determining that no chrome oxide and only minimal or trace amounts of iron oxide have been formed on a 3XX or 304 stainless steel strip surface, wherein observing a heavier iron oxide or a nickel oxide formation would indicate that a conditioning salt in a solution applied at 108 has stayed in contact with the strip surface for too long or at too high of a treatment temperature. The conditioning time period could then be shortened by earlier rinsing or quenching at 114, or the extent and/or rate of conditioning could be lowered by lowering the strip conditioning temperatures achieved at 113, in one aspect thereby preventing dulling of the strip surface and reducing the amount of pickling required at 120 to achieve a finished surface. Depending on the specific alloy being processed and its unique scale composition reactivity, it is also conceivable that the chemical composition applied to the scale for conditioning purposes be adjusted to provide more or less oxide reactivity in concert with or independent of controlling conditioning temperature and time.

In general, conditioning occurs more rapidly on metal strips with good tight surface conditions and thinner gages, and the extent of the conditioning may be fine tuned with a greater tolerance or accuracy through adjustment of time and temperature parameters relative to duller metal objects and those with heavier strip materials, the processes and systems according to the present invention thus providing opportunities for energy savings and enhanced performances and efficiencies in conditioning said thinner gage/good tight surface objects over prior art submersion systems. The descaling system can also react to the varying absorption and emissivity of shiny versus dull metal surfaces.

By keeping the temperatures of the steel coil or strip surfaces below the boiling point and the Leidenfrost temperature or Leidenfrost point of the conditioning solution during application of said solution, problems with respect to the Leidenfrost effect are avoided. The "Leidenfrost effect" with respect to a metal strip is a mottled or speckled surface appearance of the strip which reveals patches, or spots of incomplete scale conditioning, and which is believed to occur due to the Leidenfrost effect on an aqueous solution of chemicals if the surface temperature of a strip during application is above what is known as the Leidenfrost temperature or Leidenfrost point of the conditioning solution. If the strip is above the Leidenfrost temperature of the conditioning solution when the conditioning solution is applied (which is typically at or above the boiling point of aqueous conditioning solution), then a thin film of the solution is converted to a vapor phase barrier between the metal strip surface and the applied solution, this vapor phase barrier preventing the conditioning solution from contacting the surface of the strip and depositing conditioning chemicals on the metal surface upon evaporation of the liquid, resulting in a failure to condition portions of the surface and thereby producing a mottled appearance due to the contrast between conditioned and unconditioned areas. Thus, as used herein, the term "a temperature below which the Leidenfrost effect appears" refers to a temperature at which no appreciable scale in the form of dark spots exists after scale conditioning according to this invention and subsequent pickling. The Leidenfrost effect is well known and described in many publications. The interested reader is referred to U.S. Pat. No. 6,450,183 issued to Cole, et al. for "Composition, apparatus, and method of conditioning scale on a metal surface" on Sep. 17, 2002, as well as to two other publications: "Disk Model of the Dynamic Leidenfrost Phenomenon" (Martin Rein at DFD96 meeting of American Physical Society) and "Miracle Mongers and Their Methods" (pages 122-124 by Harry Houdini, published 1920 by E. P. Dutton).

Some embodiments of the present invention avoid the Leidenfrost effect by first completely wetting the strip surface to be descaled with an aqueous alkali metal hydroxide(s) conditioning solution to form a wetting layer when the metal surface temperatures are at a temperature below the Leidenfrost temperature of the conditioning solution, and then subsequently heating and increasing the wetting layer solution (e.g. 110) and the surface temperatures of the strip surface (e.g. 112) to a temperature above the melting point of the essentially anhydrous form of the alkali metal hydroxide material in the conditioning solution plus the additional value described above to reach the final treatment temperature for a sufficient time to thereby condition the metal strip surface (e.g., 112). As used herein, the term "essentially anhydrous form of the material" means after the water of solution is evaporated, even though there may be some water of hydration still present in the material. In this fashion, the formation of the vapor barriers known to cause the Leidenfrost effect, and thus the Leidenfrost effect upon the surface of the conditioned strip surfaces (e.g., of 112, 118 or 122) is avoided.

The boiling and Leidenfrost temperature points of an aqueous caustic conditioning solution are a function of caustic concentration. For example, for conditioning solution embodiments with low (40% by weight or lower) alkali hydroxide concentrations, and wherein application is desired at surface temperatures below both boiling and Leidenfrost temperature points, the steel strip surface 112 or coil 104 temperatures at application of the conditioning solution range should not exceed from about 180° F. (82° C.) to about 260° F. (127° C.), though for solutions with higher (47% or higher) alkali hydroxide concentrations the steel strip surface 112 or coil 104 may be at higher temperatures during application, meeting or even exceeding 290° F. (143° C.).

Additional energy savings may be realized by applying the aqueous caustic conditioning solution while a steel coil or strip is at higher elevated temperatures, temperatures above the conditioning solution boiling temperatures, as well as above a salt fusion temperature point of the solutions, but still near and below the Leidenfrost temperature of the conditioning solution. Thus, in one example where an application temperature of 400° F. (204° C.) is above both the boiling point and the salt fusion point of a conditioning solution, a relatively smaller heat increase is required by a furnace or heating station 113 to get to a final treatment temperature ranging from 550° F. (288° C.) or 600° F. (316° C.)). Thus, less heat energy is expended by a furnace or heating station 113, and/or over shorter the time periods, relative to the requirements for heat energy expenditures when a lower application temperature is selected (for example, one below the boiling point and/or the salt fusion point).

Different compositions may be used to effect descaling according to this invention. In one embodiment, a eutectic of sodium hydroxide (NaOH) and potassium hydroxide (KOH) at about 42% sodium hydroxide and about 58% potassium hydroxide a base alkali hydroxide composition is provided. This is a low melting composition in its essentially anhydrous condition (170° C., 338° F.), and when the water of the aqueous solution is evaporated and the remaining hydroxide fused, it is effective to perform scale conditioning. Other materials may also be added to the solution to modify the properties of either the solution or the composition, and for examples and other information commonly-assigned U.S. Pat. No. 6,450,183 issued to Cole, et al. on Sep. 17, 2002 and entitled "Composition, apparatus, and method of conditioning scale on a metal surface," the entire disclosure of which is hereby incorporated by reference, and which provides that additives such as potassium carbonate, potassium chlorate, sodium nitrate, sodium permanganate, and potassium permanganate are beneficial, for example at from about one weight percent (1%) to about five weight percent (5%).

Descaling performance and costs are directly related to the percentages of base alkali hydroxide compositions within conditioning solutions according to the present invention. Although scale conditioning may be generally achieved over a wide range of alkali hydroxide concentrations (for example, from about 5% to about 65% by weight), different percentage values have different impacts on system performance. More dilute/low alkali hydroxide percentages (from about 5% to less than about 20%) have proportionately lower surface tension and improved surface wetting characteristics relative to higher concentrations, but also impose proportionally greater heating energy penalties in order to heat and evaporate the proportionately larger amounts of water in the solution to effect scale conditioning by the fused hydroxide(s); they also require that the incoming strip temperature be lower to avoid Leidenfrost (or optionally, also the boiling point) of the more dilute solution. Higher concentration solutions (from about 20% to less than about 50%) appear to strike a good balance between delivering reasonable dissolved solids content at acceptable energy requirements. U.S. Pat. No. 6,450,183 further provides that as the concentration of the salt in solution increases, the upper temperature that can be used without encountering Leidenfrost effect increases, for example to about 700° F. For example, a 47% solution disposed upon a metal surface and then heated requires two British Thermal Units (BTU's) of energy per applied wet gram to heat the solution enough to bring the contained alkali hydroxide(s) into a molten or fused state on the surface of the metal. While not insignificant, the heat input requirement for dehydrating and fusing the applied chemical represents only about 10% of the total heat energy required by the process; the other 90% or so of the energy is absorbed by the metal itself as its temperature is raised from essentially ambient to about 600° F. (e.g., of the heating section 113).

Though it may initially appear to be preferable to use higher caustic concentrations within the conditioning solution (e.g. 48% or more), higher alkali hydroxide concentration conditioning solutions present other problems and difficulties. At concentrations much above about 47 weight percent, supersaturation and crystallization of some of the dissolved chemicals occurs at ambient temperatures. This requires mixing, transport, holding tanks, and application apparatus all to be heated to maintain homogeneous solutions. Besides presenting higher manufacture, transportation, storage, and delivery difficulties and associated costs, the higher-solids concentration in such solutions presents problems in achieving complete wetting of steel surfaces relative to lower concentration solutions. Higher surface tensions cause incomplete surface coating and wetting of the metal surface to be conditioned, in particular during dehydration and fusion of the alkali hydroxide during heat-up (e.g. by the heating section 113), which may cause incomplete scale conditioning. Wet-out and flowability characteristics are also a function of metal surface attributes, and these problems are more pronounced in conditioning the smooth, mirror finishes of the more expensive stainless and superalloy steel strips. Any area that is poorly conditioned will not be completely pickled (e.g., by the acid pickling section 120), and even a 0.01% failure in total area surface conditioning may be unacceptable, particularly in the case of stainless steel. In order to facilitate the use of higher concentration caustic solutions, e.g., those of about 25% to near 50%, as discussed above, in some embodiments of the present invention a base alkali hydroxide composition of about 42% sodium hydroxide and about 58% potassium hydroxide incorporates a small amount of surfactant into the solution, which reduces the solution surface tension caused by the presence of relatively higher dissolved caustic solids percentages in the solution, while also enabling the conditioning solution to exhibit low foam characteristics.

In another aspect, scale conditioning according to the present invention takes place in the presence of oxidizers, generally in an oxygen-containing atmosphere. Although the alkaline aqueous liquid need not contain any oxidizing agents, the thin film 110 will have an oxidizing effect on the surface oxides and thereby convert them to the desired higher oxidation state due to the absorption of atmospheric oxygen by the wetting solution and/or the diffusion of atmospheric oxygen through the molten salt film 110, and wherein the heating section 113 heats the wetted strip in an oxygen-containing atmosphere. In one example, the surface of a 10.16 centimeter (4 inch)×15.24 centimeter (6 inch) panel of 0.635 millimeter (0.025 inch) gage type 304 annealed stainless steel type 304 (18/8 chrome-nickel) was wet with an alkaline aqueous liquid solution comprising a surfactant and a base alkali hydroxide composition comprising a eutectic of about 42% sodium hydroxide (NaOH) and about 58% potassium hydroxide (KOH) and heated in a furnace in an oxygen-containing, ambient air atmosphere at about 399° C. (700° F.) for about 90 seconds, bringing the surface temperature of the wetted steel to a final treatment temperature of about 232° C. (450° F.). Upon cooling of the panel, a visual examination revealed that a pronounced scale conversion had taken place and, after a subsequent water rinse, a well-conditioned surface was apparent. Pickling of the panel after the water rinse confirmed the visual assessment of success.

One skilled in the art must also appreciate the potentially competing reactions between the alkali hydroxides and atmospheric oxygen to complete a desired descaling reaction with the simultaneous neutralization reaction between atmospheric carbon dioxide and caustic alkalis to form ineffective alkali carbonates. If a heat up rate is slow and/or the atmosphere to which the coated metal is exposed to is high in carbon dioxide (as would be the case in a furnace heated with a carbon-based fuel such as natural gas or propane to produce carbon dioxide as a product of combustion), the desired scale conditioning reaction could be retarded or prevented altogether.

One benefit of the present invention is the ability to utilize conditioning compositions that cannot be used effectively in conventional anhydrous molten salt baths because the mass of material surrounding the surface prevents atmospheric oxygen diffusion. The solution can also utilize additives that may be unstable at typical anhydrous molten salt bath temperatures. Furthermore, this invention eliminates the presence of reaction products in the applied salt and thus allows complete control of the chemistry of the salt at the metal surface. Further, with respect to direct surface wetting embodiments of the present invention, the quantity of salt consumed can be controlled through to a specified amount, in contrast to immersion systems, wherein salt consumption is largely dictated by the quantity of salt that adheres to the surface of the metal as it is withdrawn from the molten bath. Additionally, as in some cases it may be desirable to use a different salt chemistry when different metals are treated, switching solutions is easily accomplished, with no need to heat large baths of each solution. Conventional immersion technology requires a molten salt bath or tank that holds tens of thousands of pounds of liquid, hot chemical. Molten salts in general are excellent heat storage media and require significant time (several hours or longer) to cool or raise their temperature. This severely limits the ability to change process temperature "on the fly" and prevents real-time descaling optimization from being practicable. Taking into account the now-available process variables of variable chemical compositions, application rates, reaction times, and reaction temperatures, it is now possible for the first time to fully optimize precise descaling performance dynamically.

It should be noted that while the embodiments discussed thus far use sodium or potassium cations within the alkaline aqueous liquid conditioning solution, alternative solutions may utilize different cations, and associated descaling parameters and effects are primarily dependent upon the particular anion present. In one aspect, alternative conditioning solution compositions may work about as effectively with one cation as with another if other factors, such as solubility and compatibility, are equal. For example, sodium nitrate or potassium nitrate may also be effective in conditioning solutions according to the present invention, and may give comparable results in general, though typically much less soluble in a base composition and thus perhaps requiring different relative cation and/or surfactant concentrations. Other examples provided by U.S. Pat. No. 6,450,183 include sodium bisulfate, sodium carbonate, potassium carbonate, sodium formate, sodium metasilicate, sodium nitrite, sodium acid pyro phosphate and mono sodium phosphate. In some cases, the selection of a cation of an additive or caustic compound utilized may be dictated by availability. It is also noted that use of a surfactant is dependent upon compatibility with solution additives or base cations: for example, surfactants may be incompatible with permanganate compounds and thus excluded from such embodiments.

Performance of alternative compounds used as sole descaling agents may be easy to judge visually, wherein ineffectiveness of conditioning may be confirmed by subsequent pickling after which an original scale would be present in unchanged form. Evaluation criteria for selecting appropriate conditioning solutions and specified time and temperatures may include appearance of conditioned oxide with regard, e.g., to color, opacity, and uniformity; ease of removal of conditioned oxide by rinsing, wiping or subsequent acid pickling, and final appearance of a descaled metal surface with regard, e.g., to color, brightness, uniformity, and freedom from residual oxide. It is to be understood that these several criteria can vary independently in degree and direction one from another, so that there is a certain subjective element to the quantitative assignment of detrimental or beneficial effects of any descaling agents or additives.

While the present invention has been illustrated by the description of the embodiments thereof, and while these embodiments have been described in considerable detail, it is not the intention to restrict or in any way limit the scope of the appended claims to such detail. Additional advantages and modifications may readily appear to those skilled in the art. Therefore, the invention, in its broadest aspects, is not limited to the specific details, the representative apparatus, or the illustrative examples shown and described. Accordingly, departures may be made from such details without departing from the spirit or scope of the applicants' general inventive concept.

Units which are used in this specification and which are not in accordance with the metric system may be converted to the metric system with the aid of the following formulas: $1° C.=(° F.-32) 5/9$; 1 inch=$2.54 \times 10^{-2}$ m; and 1 F.p.m. (foot per minute)=$5.08 \times 10^{-3}$ m/sec.

What is claimed is:

1. A method of conditioning the surface of a metal object by treating oxide scale on the surface of the metal object, comprising:
    controlling a temperature of a metal object's surface to an application temperature below a Leidenfrost temperature point of an essentially anhydrous alkali metal hydroxide blend within an aqueous conditioning solution, the metal object's surface comprising a layer of an oxide scale that extends into the metal object an initial depth from the metal object's surface;
    wetting the metal object's surface at the controlled temperature with a layer of the aqueous conditioning solution, the aqueous conditioning solution layer engaging the oxide scale;
    heating the wetted metal object surface in an oxygen-containing atmosphere to a final conditioning temperature that is above a melting point of the essentially anhydrous alkali metal hydroxide blend by an additional value selected from a range of 112° F. (62° C.) to 262° F. (145° C.);
    in response to the heating the wetted metal object surface in the oxygen-containing atmosphere to the final conditioning temperature, evaporating water in the aqueous conditioning solution and melting the essentially anhydrous alkali metal hydroxide blend on the metal object's surface at the final conditioning temperature;
    the melted alkali metal hydroxide blend treating the metal object's surface by reacting with the engaged oxide scale and thereby reducing an extent of the layer of oxide scale into the metal object from the metal object's surface to a reduced oxide scale layer depth from the metal object's surface that is less than the initial depth of the layer of the oxide scale; and
    terminating treating of the metal object's surface at a conditioned depth into the metal object from the metal object's surface and preventing treating of oxide scale into the metal object beyond the conditioned depth, wherein the conditioned depth is less than the initial depth of the layer of oxide scale, by cooling the metal object's surface to a temperature below the final conditioning temperature at an end of a conditioning time period that is no more than thirty seconds after the water is evaporated and the melted alkali metal hydroxide blend reacts with the engaged oxide scale; and
    the terminating of the treating preventing a creation of an additional oxide scale within the metal object beyond the conditioned depth from the metal object's surface by the melted alkali metal hydroxide reacting with the engaged oxide scale.

2. The method of claim 1, further comprising:
    selecting the conditioning time period as a function of a material parameter and a dimension parameter of the metal object to produce a specified extent of conditioning of the oxide scale on the metal object's surface at the final conditioning temperature.

3. The method of claim 1, wherein the aqueous conditioning solution comprises:
    a eutectic blend of sodium hydroxide and potassium hydroxide at 30% by weight;
    3% by weight sodium nitrate;
    67% by weight water; and
    to which is added less than 1% by weight of at least one nonionic surfactant.

4. The method of claim 3, wherein the aqueous conditioning solution comprises 18% by weight of the potassium hydroxide and 12% by weight of the sodium hydroxide.

5. The method of claim 1, wherein the cooling comprises rinsing the alkali metal hydroxide from the metal object's surface.

6. The method of claim 1, further comprising:
    optimizing the conditioned depth by varying at least one of the final conditioning temperature, components of the aqueous conditioning solution, and relative amounts of reactants utilized in the aqueous conditioning solution as a function of the material parameter and the dimension parameter.

7. The method of claim 1, wherein the specified extent of conditioning comprises a minimal base metal effect, the method further comprising:
    selecting the final conditioning temperature as a function of an amount of the oxide scale on the metal object's surface.

8. The method of claim 1, wherein the conditioning time period is three seconds.

9. The method of claim 1, further comprising:
    selecting the application temperature of the metal object's surface as a temperature above a boiling point of the conditioning solution.

10. The method of claim 9, further comprising:
    selecting the application temperature of the metal object's surface as a temperature above a salt fusion temperature point of the conditioning solution.

11. The method of claim 10, further comprising:
    selecting the final conditioning temperature as an increase over the application temperature ranging from 150° F. (65° C.) to 200° F. (93° C.).

12. A method for conditioning the surface of a metal object by treating oxide scale on the surface of the metal object, comprising:
    controlling the temperature of a metal object's surface to an application temperature below a Leidenfrost temperature point of an essentially anhydrous alkali metal hydroxide blend within an aqueous conditioning solution, the metal object's surface comprising a layer of an oxide scale that extends into the metal object an initial depth from the metal object's surface;

wetting the metal object's surface at the controlled temperature with a thin-layer of the aqueous conditioning solution;

the aqueous conditioning solution layer engaging the oxide scale;

heating the wetted metal object surface to a final conditioning temperature that is above a melting point of the essentially anhydrous alkali metal hydroxide blend by an additional value selected from a range of 112° F. (62° C.) to 262° F. (145° C.);

in response to the heating the wetted metal object surface in the oxygen-containing atmosphere to the final conditioning temperature, evaporating water in the aqueous conditioning solution and melting the essentially anhydrous alkali metal hydroxide blend on the metal object's surface;

the melted alkali metal hydroxide blend treating the metal object's surface by reacting with the engaged oxide scale and thereby reducing an extent of the layer of the oxide scale into the metal object from the metal object's surface to a reduced oxide scale layer depth from the metal object's surface that is less than the initial depth of the layer of the oxide scale; and terminating treating of the metal object's surface at a conditioned depth into the metal object from the metal object's surface and preventing treating of oxide scale into the metal object beyond the conditioned depth, wherein the conditioned depth is less than the initial depth of the layer of oxide scale, by applying the aqueous conditioning solution layer in an amount wherein the reacting of the melting alkali metal hydroxide with the engaged oxide scale consumes enough of the melted alkali metal hydroxide blend in the layer on the metal object's surface to prevent treating of oxide scale on the metal object's surface beyond the conditioned depth, said terminating preventing creation of an additional oxide scale within the metal object beyond the conditioned depth from the metal object's surface.

13. The method of claim 12, wherein the aqueous conditioning solution comprises:
a eutectic blend of sodium hydroxide and potassium hydroxide at 30% by weight;
3% by weight sodium nitrate;
67% by weight water; and
to which is added less than 1% by weight of at least one nonionic surfactant.

14. The method of claim 13, wherein the aqueous conditioning solution comprises 18% by weight of the potassium hydroxide and 12% by weight of the sodium hydroxide.

15. The method of claim 12, further comprising:
optimizing the conditioned depth by varying at least one of the final conditioning temperature, components of the aqueous conditioning solution, and relative amounts of reactants utilized in the aqueous conditioning solution as a function of the material parameter and the dimension parameter.

16. The method of claim 12, wherein the specified extent of conditioning comprises a minimal base metal effect, the method further comprising:
selecting the final conditioning temperature as a function of an amount of scale on the metal object's surface.

17. The method of claim 12, further comprising:
selecting the application temperature of the metal object's surface as a temperature above a boiling point of the conditioning solution.

18. The method of claim 17, further comprising:
selecting the application temperature of the metal object's surface as a temperature above a salt fusion temperature point of the conditioning solution.

19. The method of claim 12, further comprising:
terminating the treating of the metal object's surface at the conditioned depth from the metal object's surface and preventing treating of the oxide scale beyond the conditioned depth at an end of a conditioning time period that is no more than thirty seconds after the water is evaporated and the melted alkali metal hydroxide blend reacts with the engaged oxide scale.

20. The method of claim 19, wherein the conditioning time period is three seconds.

* * * * *